Figure 1:
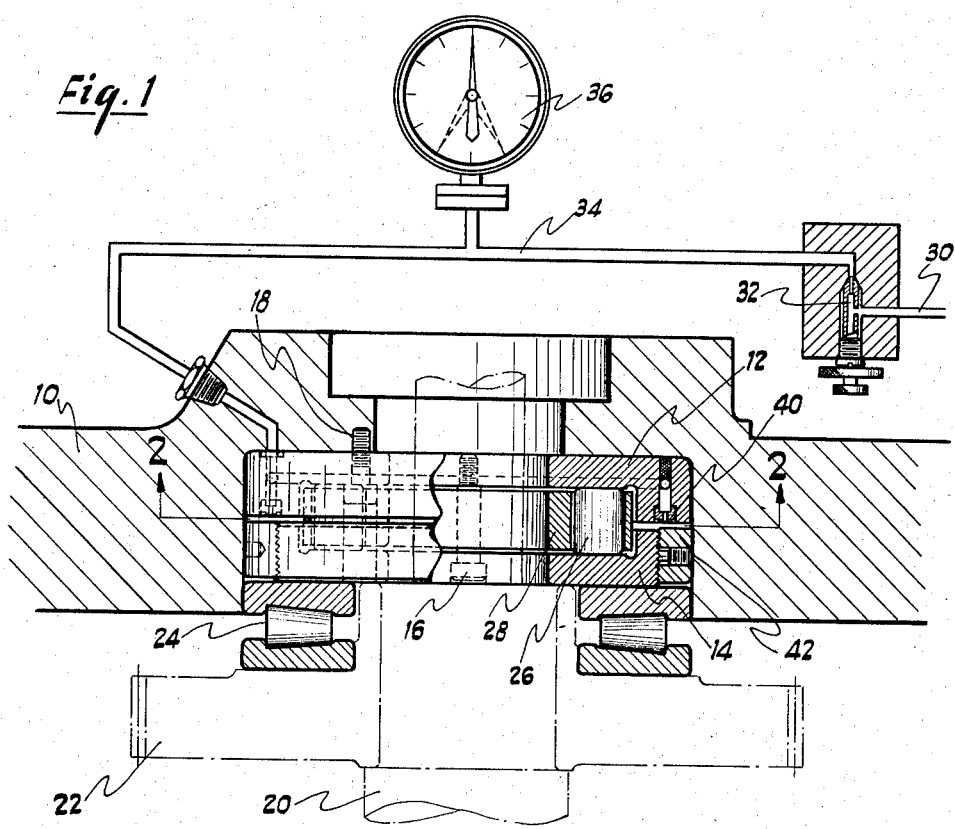

March 3, 1959

C. A. WHITNEY 2,875,611

PNEUMATIC STRAIN GAGE

Filed April 14, 1955

INVENTOR
CHARLES A. WHITNEY
BY
Joseph M. Schofield
ATTORNEY

United States Patent Office 2,875,611
Patented Mar. 3, 1959

2,875,611

PNEUMATIC STRAIN GAGE

Charles A. Whitney, Bloomfield, Conn., assignor, by mesne assignments, to Pratt & Whitney Company, Incorporated, West Hartford, Conn., a corporation of Delaware Application April 14, 1955, Serial No. 501,245

4 Claims. (Cl. 73—141)

This invention relates to strain gages and particularly to a gage for determining the stresses between two relatively rotatable members under compression.

An object of the invention is to provide opposed annular members having a series of cylindrical posts disposed between adjacent and opposite parallel surfaces of the members so that axial compressive stresses imposed upon the members will slightly compress the posts so that the two members will be brought slightly toward each other, this distance being a measure of the stress imposed upon the members.

Another object of the invention is to provide an air gage in which a limited amount of air is supplied to orifices in the surface of one of the members adjacent a surface of the other member.

A feature of importance of the invention is that one of the members is provided with a series of conduits terminating in spaced orifices disposed in an annular series in the end face of one member and adjacent a surface of the opposed member so that compression of the posts disposed between the members will bring the orifices slightly toward the opposed member and by the variations in pressures built up in the conduits and indicated by a pressure gage will determine the amount of movement of one member toward the other.

Another feature of importance is that the member opposed to that carrying the air supply conduits and orifices has a threaded ring applied thereto which may be moved as by rotation toward or from the face of the first member carrying the orifices.

In the operation of certain types of machine tools it is desirable to determine the stress between operative members of the machine so that safe pressures for certain operations may not be exceeded and may at all times be known. This is particularly true in connection with the operation known as "flow turning" which is a type of metal spinning operation for thin metal members being formed and which requires rotation between parts of the base of the machine and the spindle or other member carrying the work piece.

By the provision of compressive members such as posts disposed between opposed annular plate members the compressive stress on the posts will result in a corresponding strain serving to slightly shorten the posts and move the plates slightly toward each other. This movement of the plate members toward each other due to the strain induced on the posts by the compressive stresses on these members is measured by the build-up in pressures in the pneumatic circuit of an air gage and may be indicated by a pressure gage in the circuit.

With the above and other objects in view the invention may include the features of construction and operation set forth in the following specification and illustrated in the accompanying drawing.

In the accompanying drawing annexed hereto and forming a part of this specification, I have shown the invention embodied in a portion of a vertical turret lathe to determine the compressive load on a feed screw or shaft but it will be understood that the invention can be otherwise embodied and that the drawing is not to be construed as defining or limiting the scope of the invention, the claims appended to this specification being relied upon for that purpose.

Figure 2:
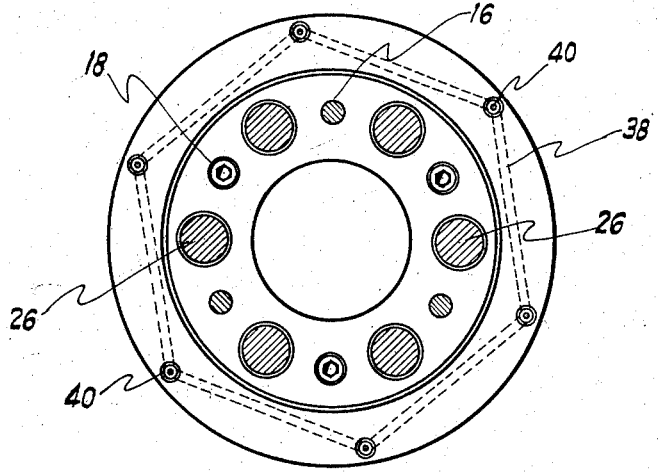

In the drawing:

Figure 1 is an elevational view, partly in section, showing two opposed members within a turret lathe adapted to be subjected to axial compressive strains, this figure also showing diagrammatically the essential features of the pneumatic gage associated with these members, and Fig. 2 is an inverted view on the plane of line 2—2 in Fig. 1 showing the arrangement of air gage conduits and their orifices in one of the annular members.

In the above mentioned drawing there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, an upper annular member to which is supplied a limited amount of air under constant pressure; second, distributing conduits within said member leading to spaced orifices in the end face of this member adjacent an opposed member; third, a second annular member; fourth, spaced cylindrical posts disposed between adjacent parallel surfaces on the two annular members so that compressive stresses placed upon the two members will effect a compressive strain upon the posts; fifth, an annular ring adjustably mounted on the second member having a face parallel to the face of the first member carrying the orifices adapted for adjustment toward and from the member carrying the orifices.

Referring more in detail to the figures of the drawing, it will be seen that a body member 10 of a machine tool or other machine subjected to heavy stresses is provided with a recess within which fits two opposed annular members 12 and 14 having adjacent parallel plane faces. The two members 12 and 14 are retained in positions in the body member 10 by retaining screws as shown. Screws 16 retain the two members 12 and 14 in proper relative position to each other but permit limited movement toward and from each other. Other screws 18 hold the plate-like members 12 and 14 in position within the body member 10 of the machine tool.

Passing centrally through the annular members 12 and 14 is a rotatable shaft or screw 20 adapted to be rotated by a gear 22. Between the gear 22 and the lower annular member 14 is a thrust bearing 24. From the above it will be understood that endwise pressure on the shaft or screw 20 will be taken up by the thrust bearing 24 and by the annular member assembly.

Disposed between the parallel end faces of these annular members 12 and 14 are metal posts 26 shown as of cylindrical form and uniformly spaced in an annular concentric series. These posts will be compressed in accordance with the pressures between members 12 and 14 which are thereby correspondingly compressed thus allowing the members 12 and 14 to approach each other. Preferably these cylinders or posts 26 are retained in this arrangement by a cage or spacing member 28. All compressive stresses imposed on the screw or shaft 20 will be taken up directly by these cylindrical members 26.

Supplied to the upper member 12 is a limited supply of air under constant pressure. This is shown diametrically as being supplied from a supply conduit 30 past an adjustable restricting valve 32 so that a limited amount of air only passes to conduit 34 leading to upper member 12. In this main conduit 34 between the restricting valve 32 and upper annular member 12 is a pressure gage 36 preferably of the well-known Bourdon type.

Disposed within the upper member 12 and connected to the supply conduit 34 are a series of conduits 38 leading to spaced orifices or nozzles 40 in the lower end face of the upper member 12. As shown, these orifices 40 are in the form of inserted nozzle members having restricted cross sectional openings.

From the above description it will be seen that air will be discharged from these orifices 40, the amount being restricted by the proximity of the end face of a member 42 threaded to and surrounding the lower member 14. As the principle of the pneumatic gage formed by orifices 40 and the limited supply of air thereto is well-known, it is not thought necessary to describe the operation of an air gage more in detail. It will be sufficient to state that compressive stresses between the two members 12 and 14 will slightly compress or strain the spaced posts 26 between these members and thus bring the orifices 40 closer to the end face of the adjustable member 42 on the lower annular member 14. This amount of this strain and movement of the orifices 40 toward the end face of the adjustable member 42 will cause a build-up of pressure in the conduit 34 leading to the orifices 40. This pressure may be indicated by the pressure gage 36 and will indicate the compressive strain of the posts and thus the stress exerted on the members 12 and 14.

By reason of the orifices 40 being arranged uniformly about the annular member 12, the discharge from them will be averaged in the event of slight tilting of the members 12 and 14. In all cases the total discharge from all orifices will be equal so that any inaccuracy due to tilting of the annular members will be prevented.

I claim as my invention:

1. A strain gage comprising two opposed members adapted for movement toward and from each other, posts disposed therebetween, and conduits to supply a limited amount of air to the face of one member adjacent the second member, said conduits having orifices in said face, and said second member having a surface parallel to the end face of the first member and opposite said orifices, so that axial pressure between said members will compress said posts and permit approaching movement of said members and thereby restrict the flow of air from said orifices, whereby the pressure of air supplied to said conduits is increased, and means indicating the pressure in said conduits.

2. A strain gage comprising two opposed members adapted for movement toward and from each other, a plurality of equally spaced posts disposed therebetween, and conduits to supply limited amounts of air under pressure to the face of one member adjacent the opposed face of said second member, said conduits having equally spaced orifices in said face, and said second member having a surface parallel to the end face of the first member and adjacent said orifices, whereby axial pressure between said members will compress said posts and permit approaching movement of said members and thereby restrict the amount of air discharged from said orifices, whereby the pressure of air supplied to said orifices will be increased, and means to indicate variations in said pressure.

3. A strain gage comprising two opposed annular members, means to retain said members in position permitting limited movement of said members toward each other, spaced posts disposed between opposed surfaces of said members, and conduits to supply limited amounts of air under pressure to one of said members, said conduits having orifices in the face of said member, said second member having a ring member thereon adjustable toward and from said first member and having a surface parallel to the end face of the first member and adjacent said orifices, whereby axial pressure between said members will compress said posts and restrict the discharge of air from said orifices and thereby increase the pressure of air supplied to said orifices, and means indicating the pressure in said conduits.

4. A strain gage comprising two opposed annular members adapted for movement toward and from each other, an annular series of equally spaced posts disposed therebetween, and conduits in one of said members to supply a limited amount of air under pressure to the face of said member opposed to and adjacent the second member, said conduits having equally spaced orifices in said face, and said second member having a member adjustable toward and from said first member and having a surface parallel to the end face of the first member and adjacent said orifices, whereby axial pressure between said members will compress said posts and permit approaching movement of said members and restrict the dischrage of air from said orifices, thereby increasing the pressure of air in the conduits leading to said orifices, and means to indicate variations in said pressure.

References Cited in the file of this patent

UNITED STATES PATENTS

| 1,421,208 | Gauldie | June 27, 1922 |
| 2,359,236 | Moore | Sept. 26, 1944 |
| 2,455,285 | Versaw | Nov. 30, 1948 |
| 2,625,061 | Mansfield | Jan. 13, 1953 |
| 2,681,565 | Kelk | June 22, 1954 |

FOREIGN PATENTS

| 812,000 | France | Jan. 27, 1937 |